US006407826B2

(12) United States Patent
Hashimoto et al.

(10) Patent No.: US 6,407,826 B2
(45) Date of Patent: Jun. 18, 2002

(54) IMAGE RECORDING APPARATUS WITH CONTROLLER FOR SELECTIVELY EXECUTING AN ENERGY SAVING MODE

(75) Inventors: Hiroshi Hashimoto, Tokyo; Junichi Kimizuka, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/123,367

(22) Filed: Jul. 28, 1998

Related U.S. Application Data

(62) Division of application No. 08/944,417, filed on Oct. 6, 1997, now Pat. No. 5,828,462, which is a division of application No. 08/420,802, filed on Apr. 12, 1995, now abandoned.

(30) Foreign Application Priority Data

Apr. 14, 1994 (JP) ............................................ 6-100766
Apr. 10, 1995 (JP) ............................................ 7-109029

(51) Int. Cl.[7] .................................................. H04N 1/21

(52) U.S. Cl. ...................... 358/296; 358/1.15; 347/237; 399/70

(58) Field of Search ............................. 399/70, 75, 23, 399/69, 76, 77; 347/236, 237, 246, 247, 248, 250; 358/296, 442, 434, 404, 1.13, 1.14, 1.15

(56) References Cited

U.S. PATENT DOCUMENTS 4,618,245 A 10/1986 Fukushi et al. ............... 399/70
4,678,316 A 7/1987 Abuyama .................... 399/70
5,151,573 A * 9/1992 Masuda ...................... 399/335
5,241,349 A * 8/1993 Nagasaka .................... 399/70
5,280,162 A * 1/1994 Marwin ...................... 235/462
5,280,328 A * 1/1994 Goto et al. .................... 399/70
5,321,478 A 6/1994 Nakamura et al. ............ 399/70
5,321,479 A * 6/1994 Yoshida et al. ............... 399/70
5,349,199 A * 9/1994 Rabjohns et al. ...... 250/559.29
5,457,516 A 10/1995 Kim ............................ 399/37
5,489,935 A 2/1996 Dornier ....................... 399/67
5,581,668 A * 12/1996 Oida et al. ................. 358/1.14
5,589,923 A 12/1996 Lee et al. ..................... 399/28

* cited by examiner

*Primary Examiner*—Mark Wallerson
(74) *Attorney, Agent, or Firm*—Fitzpatrick, Cella, Harper & Scinto

(57) ABSTRACT

An image recording apparatus includes an image forming device, a fixing device, a cooling device and a controller. The image forming device forms an image on a recording medium on the basis of an image signal generated by an image signal generating unit. The fixing device uses heat to fix the image formed on the recording medium, and the cooling device cools the inside of the apparatus. The controller selectively executes either a first economy mode in which the cooling device is activated and the fixing device is inactivated on the basis of a command from the image signal generating unit, or a second economy mode in which both the cooling device and the fixing device are inactivated.

20 Claims, 20 Drawing Sheets

| COMMAND CODE | FUNCTION |
|---|---|
| 45H | SLEEP DESIGNATION |
| 46H | WAKE-UP DESIGNATION |
| 80H<br>**H | SLEEP MODE DESIGNATION (2 BYTE COMMAND) |

FIG. 8

| | | |
|---|---|---|
| MSB | FIRST BIT | 0 |
| | SECOND BIT | 0 |
| | THIRD BIT | 0 |
| | FOURTH BIT | 0 |
| | FIFTH BIT | SLEEP LEVEL CODE (BINARY THIRD DIGIT) |
| | SIXTH BIT | SLEEP LEVEL CODE (BINARY SECOND DIGIT) |
| | SEVENTH BIT | SLEEP LEVEL CODE (BINARY FIRST DIGIT) |
| LSB | EIGHTH BIT | PARITY (ODD) |

FIG. 9

| SLEEP LEVEL CODE | PROCESSING CONTENT |
|---|---|
| 000 | STOP POWER OF FIXING DEVICE |
| 001 | STOP POWER OF FIXING DEVICE, STOP COOLING FAN |
| 010 | UNUSED |
| 011 | UNUSED |
| 100 | UNUSED |
| 101 | UNUSED |
| 110 | UNUSED |
| 111 | UNUSED |

| SLEEP LEVEL CODE | PROCESSING CONTENT |
|---|---|
| 000 | STOP POWER OF FIXING DEVICE |
| 001 | STOP POWER OF FIXING DEVICE, STOP COOLING FAN |
| 010 | UNUSED |
| 011 | UNUSED |
| 100 | UNUSED |
| 101 | UNUSED |
| 110 | UNUSED |
| 111 | UNUSED |

| | | |
|---|---|---|
| MSB | FIRST BIT | 0 |
| | SECOND BIT | 0 |
| | THIRD BIT | 0 |
| | FOURTH BIT | 0 |
| | FIFTH BIT | STOP DETECTION BY PHOTOSENSOR |
| | SIXTH BIT | STOP COOLING FAN |
| | SEVENTH BIT | STOP POWER OF FIXING DEVICE |
| LSB | EIGHTH BIT | PARITY (ODD) |

| COMMAND CODE | FUNCTION |
|---|---|
| 45H | SLEEP DESIGNATION |
| 46H | WAKE-UP DESIGNATION |
| 80H<br>**H | SLEEP MODE DESIGNATION (2 BYTE COMMAND) |
| 83H<br>**H | SLEEP-IN DELAY TIME DESIGNATION (2 BYTE COMMAND) |
| 85H<br>**H | SLEEP TIME DESIGNATION (2 BYTE COMMAND) |

FIG. 21

| | | |
|---|---|---|
| MSB | FIRST BIT | 0 |
| | SECOND BIT | SLEEP-IN DELAY TIME (BINARY SIXTH DIGIT) |
| | THIRD BIT | SLEEP-IN DELAY TIME (BINARY FIFTH DIGIT) |
| | FOURTH BIT | SLEEP-IN DELAY TIME (BINARY FOURTH DIGIT) |
| | FIFTH BIT | SLEEP-IN DELAY TIME (BINARY THIRD DIGIT) |
| | SIXTH BIT | SLEEP-IN DELAY TIME (BINARY SECOND DIGIT) |
| | SEVENTH BIT | SLEEP-IN DELAY TIME (BINARY FIRST DIGIT) |
| LSB | EIGHTH BIT | PARITY (ODD) |

FIG. 22

| | | |
|---|---|---|
| MSB | FIRST BIT | 0 |
| | SECOND BIT | SLEEP-TIME (BINARY SIXTH DIGIT) |
| | THIRD BIT | SLEEP-TIME (BINARY FIFTH DIGIT) |
| | FOURTH BIT | SLEEP-TIME (BINARY FOURTH DIGIT) |
| | FIFTH BIT | SLEEP-TIME (BINARY THIRD DIGIT) |
| | SIXTH BIT | SLEEP-TIME (BINARY SECOND DIGIT) |
| | SEVENTH BIT | SLEEP-TIME (BINARY FIRST DIGIT) |
| LSB | EIGHTH BIT | PARITY (ODD) |

FIG. 23

| COMMAND CODE | FUNCTION |
|---|---|
| 45H | SLEEP DESIGNATION |
| 46H | WAKE-UP DESIGNATION |
| 80H<br>**H | SLEEP MODE DESIGNATION (2 BYTE COMMAND) |
| 83H<br>**H | SLEEP-IN DELAY TIME DESIGNATION/SLEEP TIME DESIGNATION (2 BYTE COMMAND) |

FIG. 24

| | | |
|---|---|---|
| MSB | FIRST BIT | 0 |
| | SECOND BIT | SLEEP-IN DELAY TIME (BINARY THIRD DIGIT) |
| | THIRD BIT | SLEEP-IN DELAY TIME (BINARY SECOND DIGIT) |
| | FOURTH BIT | SLEEP-IN DELAY TIME (BINARY FIRST DIGIT) |
| | FIFTH BIT | SLEEP TIME (BINARY THIRD DIGIT) |
| | SIXTH BIT | SLEEP TIME (BINARY SECOND DIGIT) |
| | SEVENTH BIT | SLEEP TIME (BINARY FIRST DIGIT) |
| LSB | EIGHTH BIT | PARITY (ODD) |

| SLEEP LEVEL CODE | PROCESSING CONTENT |
|---|---|
| 000 | STOP POWER OF FIXING DEVICE |
| 001 | STOP POWER OF FIXING DEVICE, STOP COOLING FAN |
| 010 | STOP MPU CLOCK |
| 011 | UNUSED |
| 100 | UNUSED |
| 101 | UNUSED |
| 110 | UNUSED |
| 111 | UNUSED |

IMAGE RECORDING APPARATUS WITH CONTROLLER FOR SELECTIVELY EXECUTING AN ENERGY SAVING MODE

This application is a division of application No. 08/944,417, filed Oct. 6, 1997, which issued as U.S. Pat. No. 5,828,462 on Oct. 27, 1998, which is a division of application No. 08/420,802, filed Apr. 12, 1995, now abandoned.

BACKGROUND OF THE INVENTION

1. Field of the Invention

The present invention relates to energy saving control of an image recording apparatus which has an interface with an external unit such as a personal computer and records an image on a record sheet based on image information inputted from an external unit through the interface.

2. Related Background Art

As an image recording apparatus of this type, a laser printer which uses an electrographic process has been known. Many laser printers have the following three types of operation modes.

First, a print mode in which a record sheet is transported and a print operation is carried out.

Secondly, a stand-by mode in which an immediate print operation is ready. For example, in a laser printer having a thermal fixing unit using a halogen heater, temperature control is effected to maintain the thermal fixing unit at a slightly lower temperature in the stand-by mode than a fixing temperature in the print mode.

Thirdly, a sleep mode which is set by a social demand in recent energy saving trend and in which a power consumption is further reduced than that in the stand-by mode.

Many prior art laser printers comprise video control means for generating bit map data for each pixel as a video signal from data described by a command scheme such as PDL (page description language) based on a record command from the external unit and record control means for recording an image represented by the video signal. The control of the operation modes is effected by the record control means. A command to shift to the sleep mode and return from the sleep mode is effected from the video control means to the record control means based on information from the external unit.

In the prior art sleep mode, however, since the energization and deenergization of the thermal fixing unit used in the laser printer are uniformly set, optimum energy saving control to fit a variety of operation states of the printer is not attained.

SUMMARY OF THE INVENTION

It is an object of the present invention to provide an image recording apparatus which permits optimum energy saving control for various operation states of the printer. In particular, it is an object of the invention to provide an image recording apparatus in which execution of energy saving modes is performed selectively.

An image recording apparatus in accordance with the present invention includes an image forming means, a fixing means, a cooling means and a control means. The image forming means is for forming an image on a recording medium on the basis of an image signal generated by an image signal generating unit. The fixing device is for heat-fixing the image formed on the recording medium; the cooling means is for cooling the inside of the apparatus. The control means is for selectively executing either a first economy mode, in which the cooling means is activated and the fixing means is inactivated on the basis of a command from the image signal generating unit, or a second economy mode in which both the cooling means and the fixing means are inactivated.

Other objects, advantages and effects of the present invention will be apparent from the accompanying drawings, following description and claims.

BRIEF DESCRIPTION OF THE DRAWINGS

FIG. 8 shows a bit configuration of a sleep mode designation command in the first embodiment, FIG. 9 illustrates a relation between a sleep level code and a process content in the first embodiment, FIG. 21 shows a bit configuration of a sleep-in delay time designation command in the seventh embodiment, FIG. 22 illustrates a bit configuration of a sleep time designation command in the seventh embodiment, FIG. 23 illustrates a list of command codes relating to sleep control in an eighth embodiment of the present invention, FIG. 24 illustrates a bit configuration of a sleep-in delay time designation/sleep time designation command in the eighth embodiment.

DETAILED DESCRIPTION OF THE PREFERRED EMBODIMENTS

Preferred embodiments of the present invention are now described in conjunction with the accompanying drawings.

First Embodiment

Figure 1:
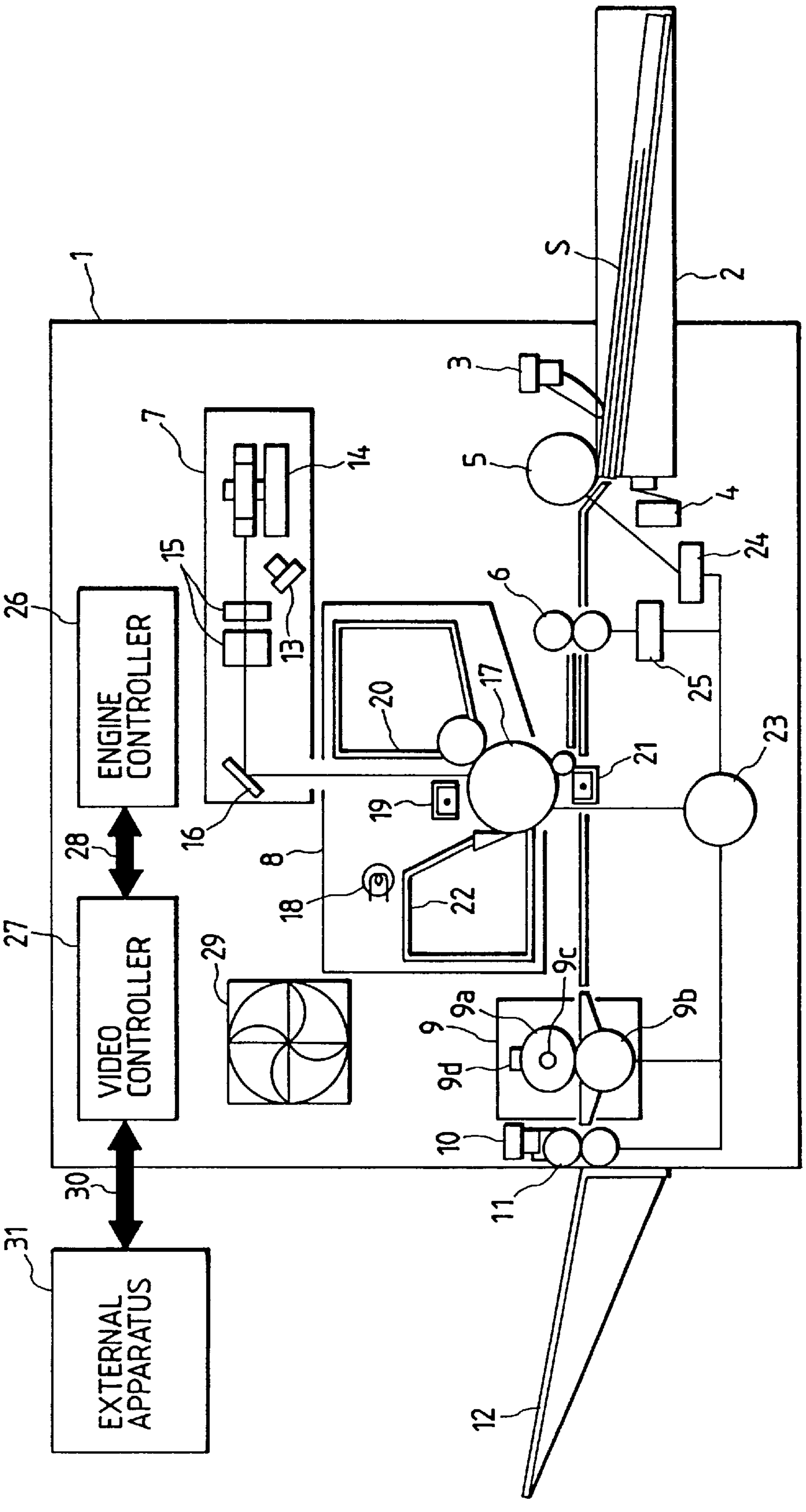
FIG. 1 shows a schematic sectional view of a laser printer in a first embodiment of the present invention.

FIG. 1 shows a schematic sectional view of a construction of an image recording apparatus in an embodiment of the present invention.

A laser printer main unit 1 (hereinafter referred to as a main unit 1) has a cassette 2 for accommodating record sheets S, a cassette sheet sensor 3 for sensing the presence or absence of the record sheet S in the cassette 2, a cassette size sensor 4 (comprising a plurality of microswitches) for detecting a size of the record sheet S of the cassette 2 and a sheet feed roller 5 for feeding the record sheet S from the cassette 2.

A pair of registration rollers 6 for synchronously feeding the record sheet S is arranged downstream the sheet feed roller 5. An image forming unit 8 for forming a toner image on the record sheet S based on a laser beam from a laser scanner unit 7 is arranged downstream the pair of registration rollers 6.

A fixing unit 9 for thermally fixing the toner image formed on the record sheet S is arranged downstream the image forming unit 8, and a sheet ejection sensor 10 for sensing the sheet transport state of a sheet ejection unit, a sheet ejection roller 11 for ejecting the record sheet S and a stack tray 12 for stacking recorded sheet S are arranged downstream the fixing unit 9.

The laser scanner unit 7 comprises a laser unit 13 for emitting a laser beam modulated with an image signal (VDO) sent from an external unit 28 to be described later, a polygon motor 14 for scanning the laser beam from the laser unit 13 onto a photoconductor drum 17 to be described later, a group of focusing lenses 15 and a deflection mirror 16.

The image forming unit 8 comprises the photoconductor drum 17, a pre-exposure lamp 18, a primary charger 19, a developing unit 20, a transfer charger 21 and a cleaner 22 which are required in a known electrographic process. The fixing unit 9 comprises a heat roller 9_a_, a pressure roller 9_b_, a halogen heater 9_c_ arranged in the heat roller and a thermistor 9_d_ for detecting a surface temperature of the heat roller.

A main motor 23 is energized through a sheet feed roller clutch 24 and the pair of registration rollers 6 are energized through a registration roller 25, and units in the image forming units 8, the fixing unit 9 and the sheet ejection roller 11 are also energized.

An engine controller 26 controls the electrographic process by the laser scanner unit 7, the image forming unit 8 and the fixing unit 9 and controls the feed of the record sheet in the main unit 1.

A video controller 27 is connected to the external unit 31 such as a personal computer through a general purpose interface (Centronics, RS232C, etc.) 30 and develops image data sent from the general purpose interface 30 into bit data which is converted to a VDO signal and sent to the engine controller 26.

A video interface 28 is communication means between the video controller 27 and the engine controller 26.

A cooling fan 29 is. rotated and stopped by the engine controller 26 to cool the interior of the printer, particularly the video controller 27.

Figure 2:
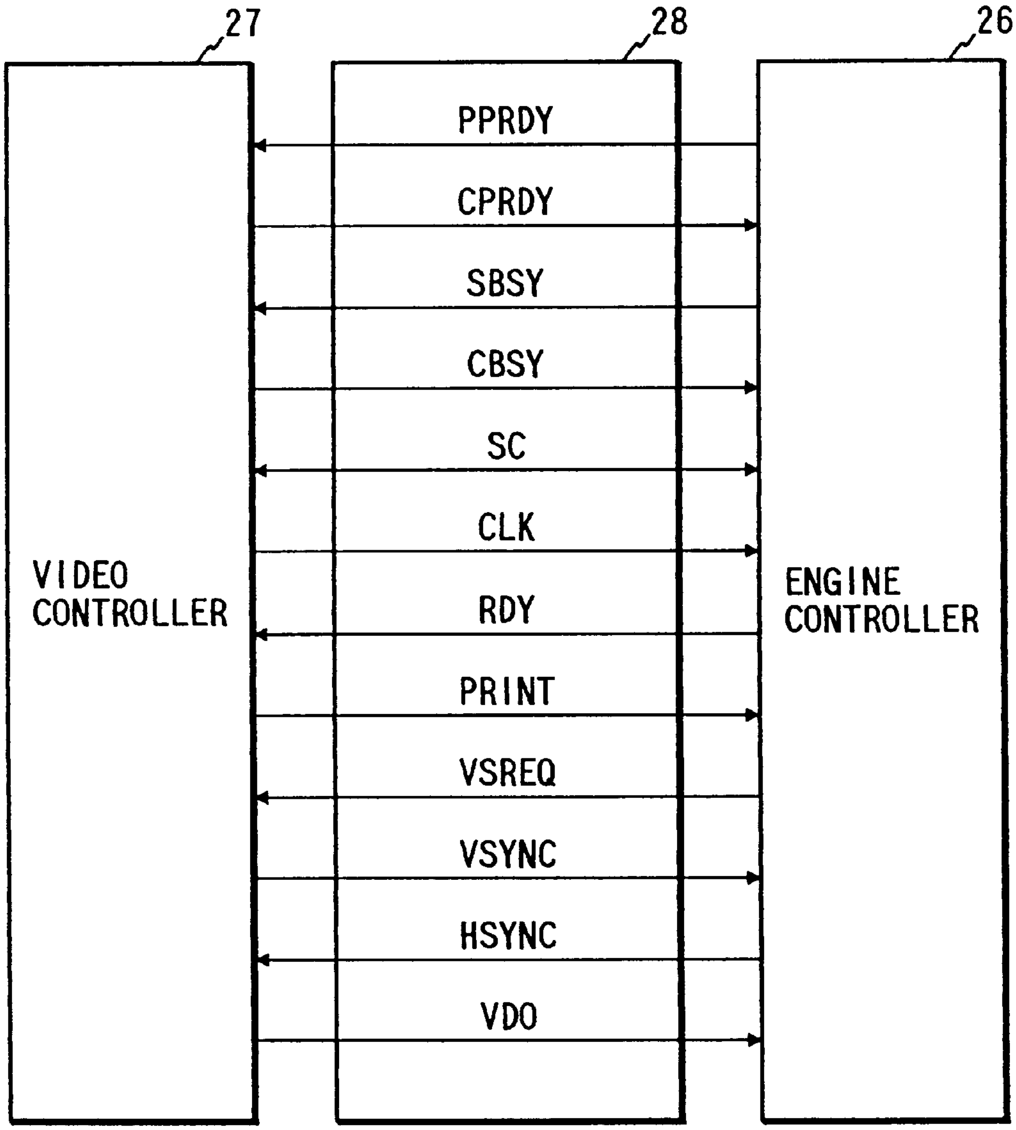
FIG. 2 shows a block diagram of a video interface of the first embodiment.

FIG. 2 shows a block diagram of a configuration of the video interface 28 shown in FIG. 1.

In FIG. 2, CPRDY is a signal indicating that the external unit 3 is ready to communicate, and it is sent from the video controller 27 to the video controller 26.

PPRDY is a signal indicating that the engine controller 26 is ready to communicate and it is sent from the engine controller 26 to the video controller 27.

SBSY is a status valid signal which is sent from the engine controller 26 to the video controller 27.

CBSY is a command valid signal which is sent from the video controller 27 to the engine controller 26.

SC is a status/command signal. When the status valid signal SBSY is true, it is sent from the engine controller 26 to the video controller 27 as status data indicating the internal status of the printer, and when the command valid signal CBSY is true, it is sent from the video controller 27 to the engine controller 26 as command data indicating a command from the video controller 27 to the engine controller 26.

CLK is a synchronization clock of the status/command signal SC and it is sent from the video controller 27 to the engine controller 26. The engine controller 26 sends back a corresponding status to each command from the video controller.

Namely, the signals SBSY, CBSY, SC and CLK conduct the hand shaking serial communication.

RDY is a ready signal which is true when the engine controller 26 is ready to print and it is sent from the engine controller 26 to the video controller 27.

PRINT is a print signal which is true when the video controller 27 indicates the start of print and it is sent from the video controller 27 to the engine controller 26.

VSREQ is a vertical synchronization request signal by which the engine controller 26 requests the output of a vertical synchronization signal VSYNC to be described later to the video controller 27.

VSYNC is the vertical synchronization signal for vertically (sub-scan direction/sheet feed direction) synchronizing the image output sent from the video controller 27 to the engine controller 26.

BD is a horizontal synchronization signal for horizontally (main scan direction/laser scan direction) synchronizing the image output sent from the engine controller 26 to the video controller 27.

VDO is an image signal by which the video controller 27 serially sends a dot image to the engine controller 26 in synchronism with the vertical synchronization signal VSYNC and the horizontal synchronization signal BD.

Figure 3:
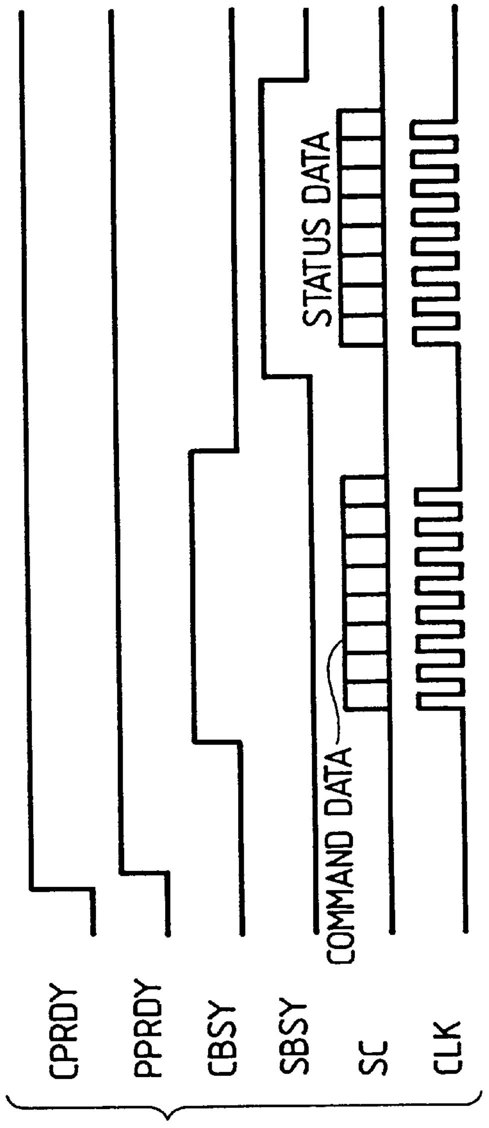
FIG. 3 shows a timing chart for illustrating serial communication in the video interface of the first embodiment.

FIG. 3 shows a timing chart of a serial communication operation.

When the main unit 1 is powered and the engine controller 26 is initialized and is ready for the serial communication, the engine controller 26 renders the PPRDY true.

On the other hand, when the video controller 27 is powered, initialized and is ready for the serial communication, the video controller 27 renders CPRDY true. The video controller 27, after confirming that the PPRDY is true for a predetermined time period, determined that it is ready for the serial communication, and renders CBSY true if necessary, and sends an 8-bit command through the SC line in synchronism with CLK. Then, it renders CBSY false and waits for the send-back of the status from the engine controller 26.

When the engine controller 26 receives the command, it renders SBSY true to send back the status in accordance with the content of the command. When the video controller 27 detects the true state of SBSY, it starts the transmission of CLK and the engine controller 26 sends back the status through the SC line in synchronism with CLK and renders SBSY false.

When the engine controller 26 confirms the true state of CPRDY for a predetermined time period, it is determined that the serial communication is ready and the command is valid.

Figure 5:
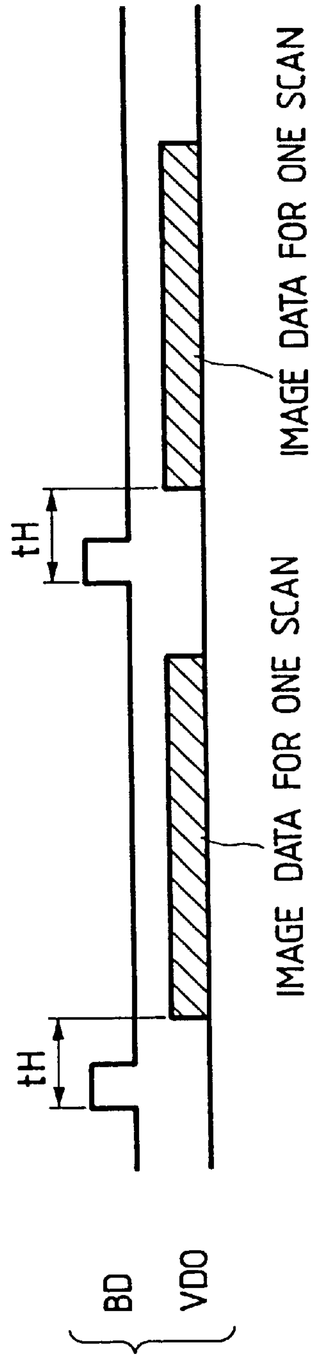
FIG. 5 shows a timing chart of the print operation in the first embodiment.
Figure 4:
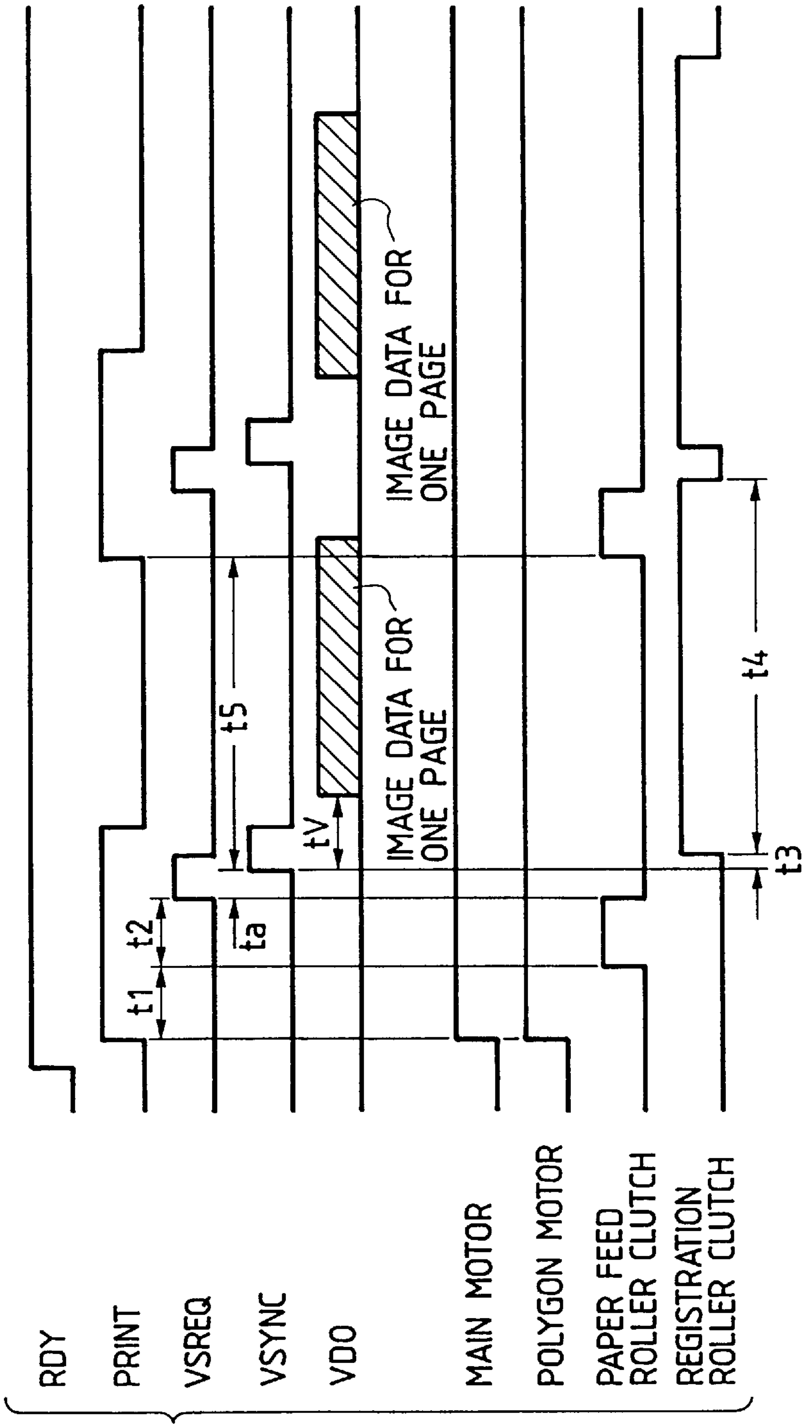
FIG. 4 shows a timing chart of a print operation in the first embodiment.

FIGS. 4 and 5 show timing charts of a print operation of the main unit 1. Referring to those figures, the print operation is explained.

When the engine controller 26 is ready for the print operation, it renders RDY true and informs the print ready state to the video controller 27. In response thereto, the video controller 27 renders PRINT true if a print request is issued to indicate the start of printing.

When the engine controller 26 detects the true state of PRINT, it starts to drive the main motor 23 and the polygon motor 14. When the main motor is driven, the photoconductor drum 17, the fixing roller (in the fixing unit 9) and the sheet ejection roller 11 are rotated. The engine controller 26 activates the high voltage for the primary charger 19, the developing unit 20 and the transfer charger 21, turns on the sheet feed clutch 24 to drive the sheet feed roller 5 t1 second after the steady state of the rotation of the polygon motor 14 (see FIG. 4), and feeds the record sheet S toward the pair of registration rollers 6.

At the timing when the leading edge of the record sheet S reaches the pair of registration rollers 6 (t2 second after the drive of the sheet feed roller 5), the engine controller 26 sends the vertical synchronization request signal VSREQ to the video controller 27 and turns off the sheet feed clutch 24 to stop the drive of the sheet feed roller 5.

When the video controller 27 completes the development of the image information into the dot image and the image signal VDO is ready to output, it confirms that the vertical synchronization request signal VSREQ is true and renders the vertical synchronization signal VSYNC true, and starts to output one page of image signal VDO tV second later in synchronism thereto.

The engine controller 26 turns on the registration roller clutch 25 t3 second after the rise of the vertical synchronization signal VSYNC to drive the pair of registration rollers 6. The pair of registration rollers 6 are driven for t4 second until the trailing edge of the record sheet S is fed past the pair of registration rollers 6.

During this period, the engine controller 26 sends the horizontal synchronization signal BD to the video controller 27 at a predetermined timing in synchronism with the laser scan and modulates the laser beam emitted from the laser unit 13 based on the image signal VDO.

As shown in FIG. 5, the video controller 27 outputs one scan of image. signal VDO in synchronism with the rise of the horizontal synchronization signal BD.

When the next page is to be printed, the print signal PRINT is rendered true t5 second later. Then, the same operation as that for the first page is carried out.

Through the above operation, the record sheet S is sequentially fed to the sheet feed roller 5, the pair of registration rollers 6, the image forming unit 8, the fixing unit 9 and the sheet ejection roller 11 so that the image is recorded.

The energy saving, that is, the sleep control in the present embodiment is now explained.

The printer 1 is either in the stand-by mode or in the sleep mode except in the print mode and provided that no abnormal state such as failure occurs.

In the stand-by mode, it may be immediately shifted to the print mode upon the print request. Specifically, a temperature of the fixing unit 9 is set to a lower temperature than a temperature in the print mode (for example, the fixing unit temperature in the stand-by mode is 150° C. while the fixing unit temperature in the print mode is 190° C.) and the cooling fan 29 is energized to cool the video controller.

On the other hand, in the sleep mode, the power consumption is more reduced than that in the stand-by mode. The sleep mode has a sleep level 0 and a sleep level 1. In the level 0, the energization to the fixing unit 9 is stopped, and in the level 1, the energization to the fixing unit 9 is stopped as well as the energization of the cooling fan 29 is stopped. The shift from the stand-by mode to the sleep mode is controlled by a command sent from the video controller 27 to the engine controller 26 through the video interface 28.

Figures 6, 7:
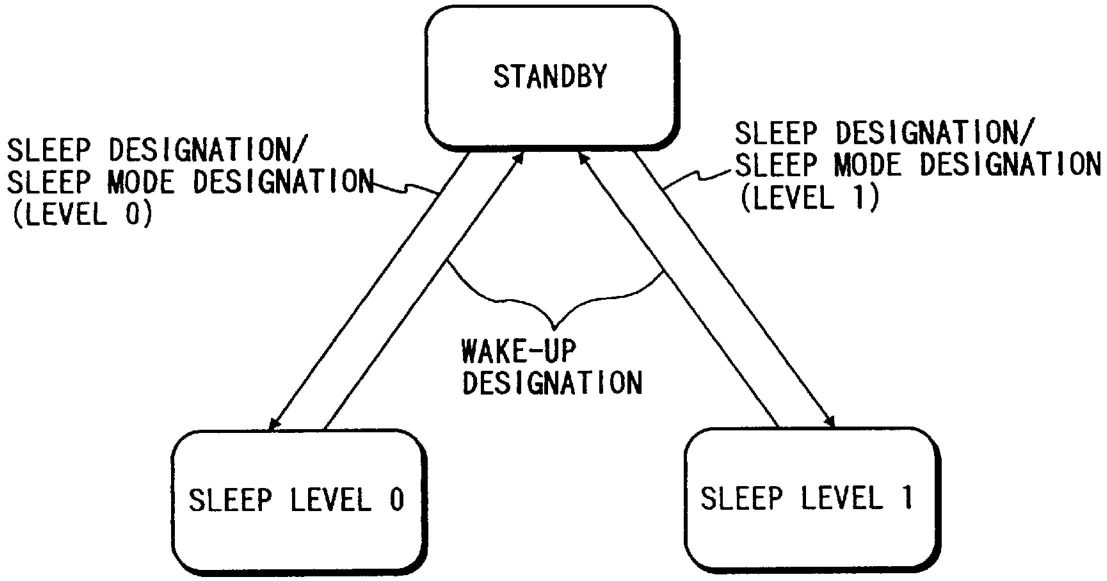
FIG. 6 shows a state transition chart of sleep control in the first embodiment.
FIG. 7 shows a list of command codes relating to the sleep control in the first embodiment.

FIG. 6 shows a state transition chart illustrating the state transition for the sleep control of the main unit 1.

As shown, the transition from the stand-by mode to the sleep level 0 mode is effected by the sleep designation command and the designation of the sleep level 0 by the sleep mode designation command.

The transition from the stand-by mode to the sleep level 1 mode is effected by the sleep designation command and the designation of the sleep level 1 mode by the sleep mode designation command.

The mode is shifted to the stand-by mode from the level 0 or level 1 sleep mode by a wake-up designation command.

FIG. 7 shows command codes relating to the sleep control. 45H in a hexadecimal code is allocated to the sleep designation, and 46H is allocated to the wake-up designation.

The sleep mode designation is made by a 2-byte command. The video controller 27 sends a command code 80H at the first byte, and sends a predetermined command code at the second byte to designate the sleep level.

FIG. 8 shows a bit configuration of the second byte of the sleep mode designation command. The command designates the sleep level by the three bits (5th to 7th bits) of the eight bits.

FIG. 9 illustrates a relation between the sleep level code and a process content. A code 000 designates the sleep level 0, that is, the deenergization of the fixing unit. A code 001 designate the sleep level 1, that is, the deenergization of the fixing unit and the deenergization of the cooling fan. Codes 010 to 111 are unused.

Figure 10:
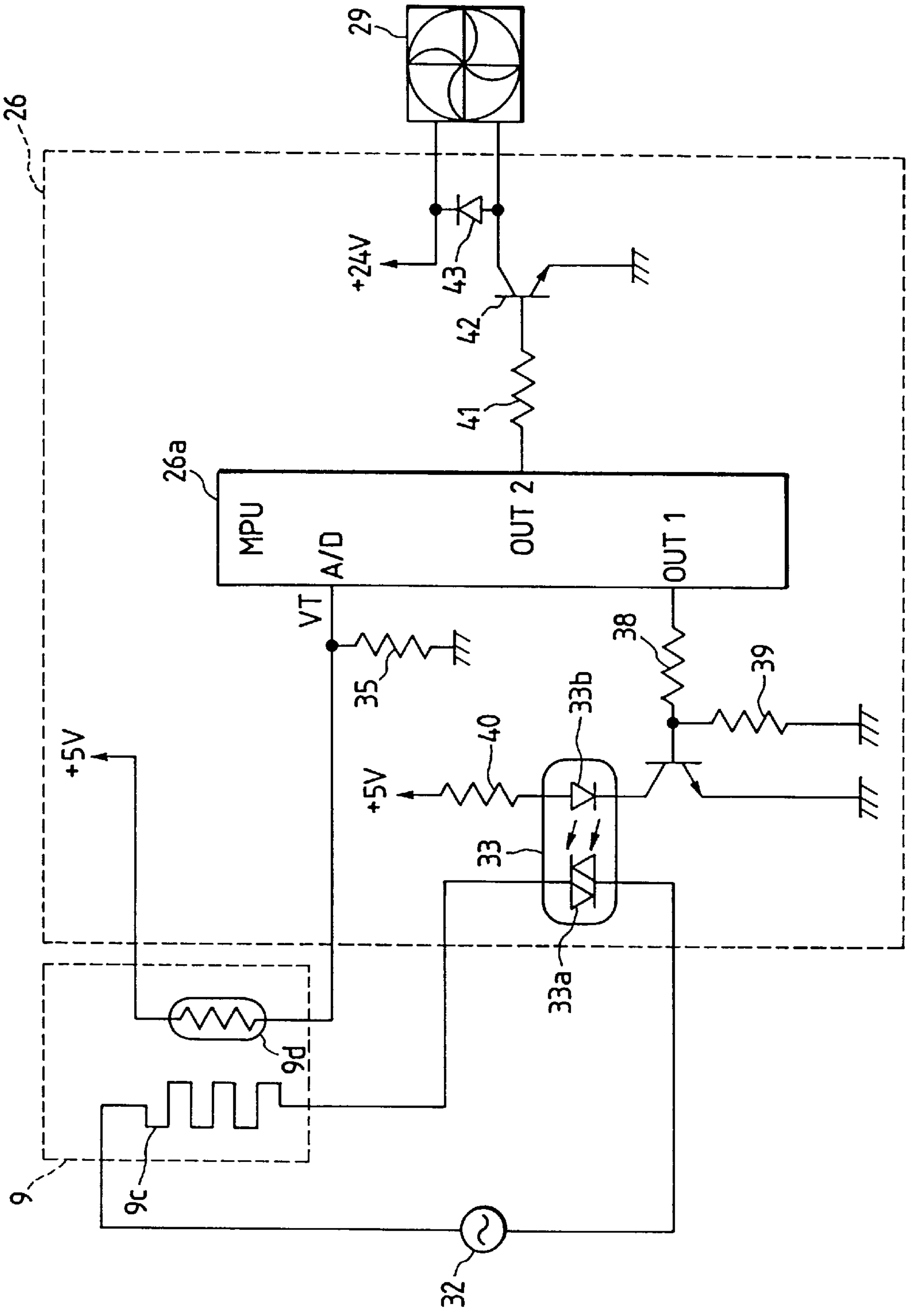
FIG. 10 shows a circuit diagram of a configuration relating to fixing unit control and cooling fan control in the first embodiment.

FIG. 10 shows a circuit diagram of a halogen heater drive circuit for controlling the temperature of the fixing unit 9 shown in FIG. 1 and a drive circuit for the cooling fan 29.

In FIG. 10, the halogen heater 9*c* in the fixing unit 9 is connected to a commercial power source (AC power source) 32 through a TRIAC 33*a* in a SSR 33 which is a solid state relay comprising the TRIAC 33*a*, a LED 33*b* and a zero-crossing detection circuit (not shown). When the LED 33*b* emits a light, the TRIAC 33*a* conducts and the halogen heater is turned on. The LED 33*b* is connected to a +5V power supply (generated from the commercial power source by a low voltage power circuit (not shown)) which powers the DC-powered engine controller 26 and has a cathode thereof connected to a collector of a grounded emitter NPN transistor 37. A base of the transistor 37 is connected to an output port (OUT1) of the MPU 26*a* through a grounded resistor 39 and a resistor 38.

The MPU 26*a* is a microcomputer which controls the engine controller 26. When the MPU 26*a* renders the output port (OUT1) to L (off), the LED 33*b* is not turned on and the halogen heater 9*c* is not turned on. When it renders an output port (OUT2) to H (on), the LED 33*b* is turned on and the halogen heater 9*c* is turned on.

The thermistor 9*d* in the fixing unit 9 has one end thereof connected to the DC +5 V power supply and the other end thereof connected to a resistor 35.

An analog voltage Vt determined by the thermistor 9*d* and the resistor 35 is supplied to an A/D conversion input port of the MPU 26*a* and the MPU 26*a* detects the fixing unit temperature.

In the above arrangement, the MPU 26*a* monitors the fixing unit temperature by the analog voltage Vt and changes an on/off duty factor of the output port to control the temperature of the fixing unit 9.

On the other hand, a transistor for driving the cooling fan 29 is connected to the output port (OUT2) of the MPU 26*a* through a base resistor 41. A counter emf absorbing diode 43 for the cooling fan 29 is connected to a DC +24 V power supply which powers to a collector of the transistor 43 and the cooling fan. Accordingly, when the MPU 26*a* renders the output port (OUT2) to H (on), the cooling fan is energized, and when it renders the output port (OUT2) to L (off), the cooling fan is deenergized.

In the above arrangement, the video controller 27 may arbitrarily designates the sleep level 0 mode in which the cooling fan is energized and the sleep level 1 mode in which the cooling fan is deenergized.

Second Embodiment

A second embodiment of the present invention is now explained. A difference between the second embodiment and the first embodiment resides in that the sleep. level may be changed only by the sleep mode designation command.

Figure 11:
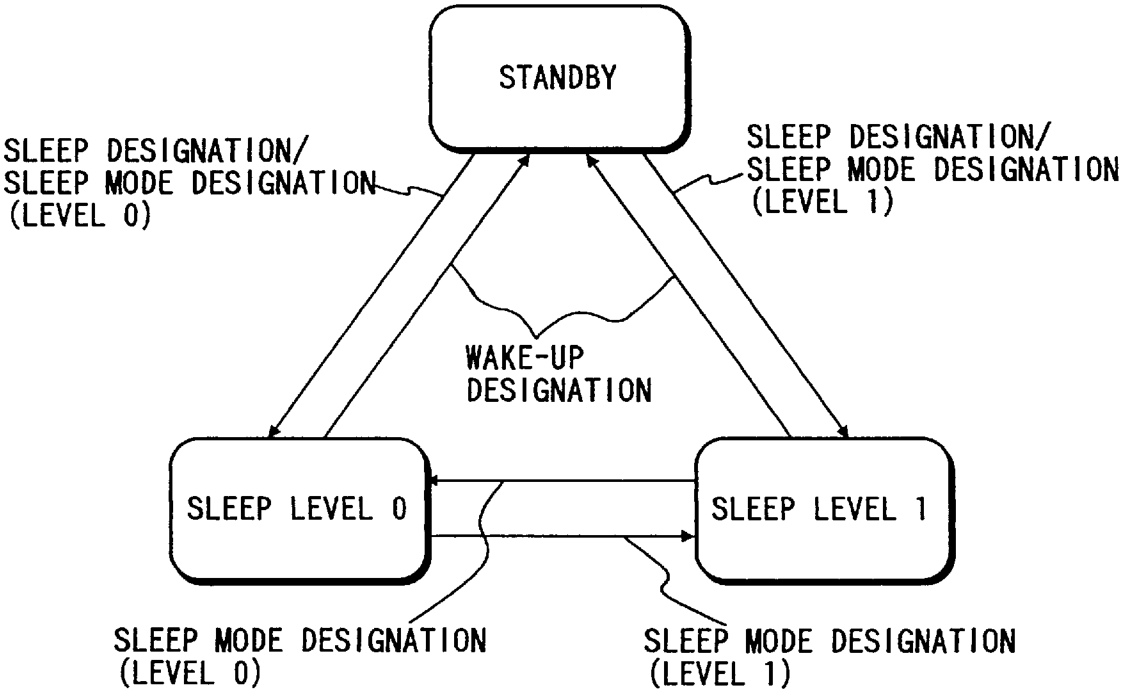
FIG. 11 shows a state transition chart of sleep control in a second embodiment of the present invention.

FIG. 11 shows a state transition chart relating to the sleep control in the second embodiment.

When the printer is in the sleep level 0 state and the video controller 27 sends the sleep mode designation command to the engine controller 26 while designating the sleep level 1, the printer is shifted to the sleep level 1 mode. On the other hand, when the printer is in the sleep level 1 mode and the sleep mode designation command is sent while designating the sleep level 0, the printer is shifted to the sleep level 0 mode.

In this manner, the video controller 27 may omit the wake-up designation command and the sleep designation command when the sleep level is to be changed so that a process load is reduced.

Third Embodiment

A third embodiment of the present invention is now explained. A difference between the third embodiment and the first embodiment resides in the addition of photo-sensor control to the control in the sleep mode.

Figure 12:
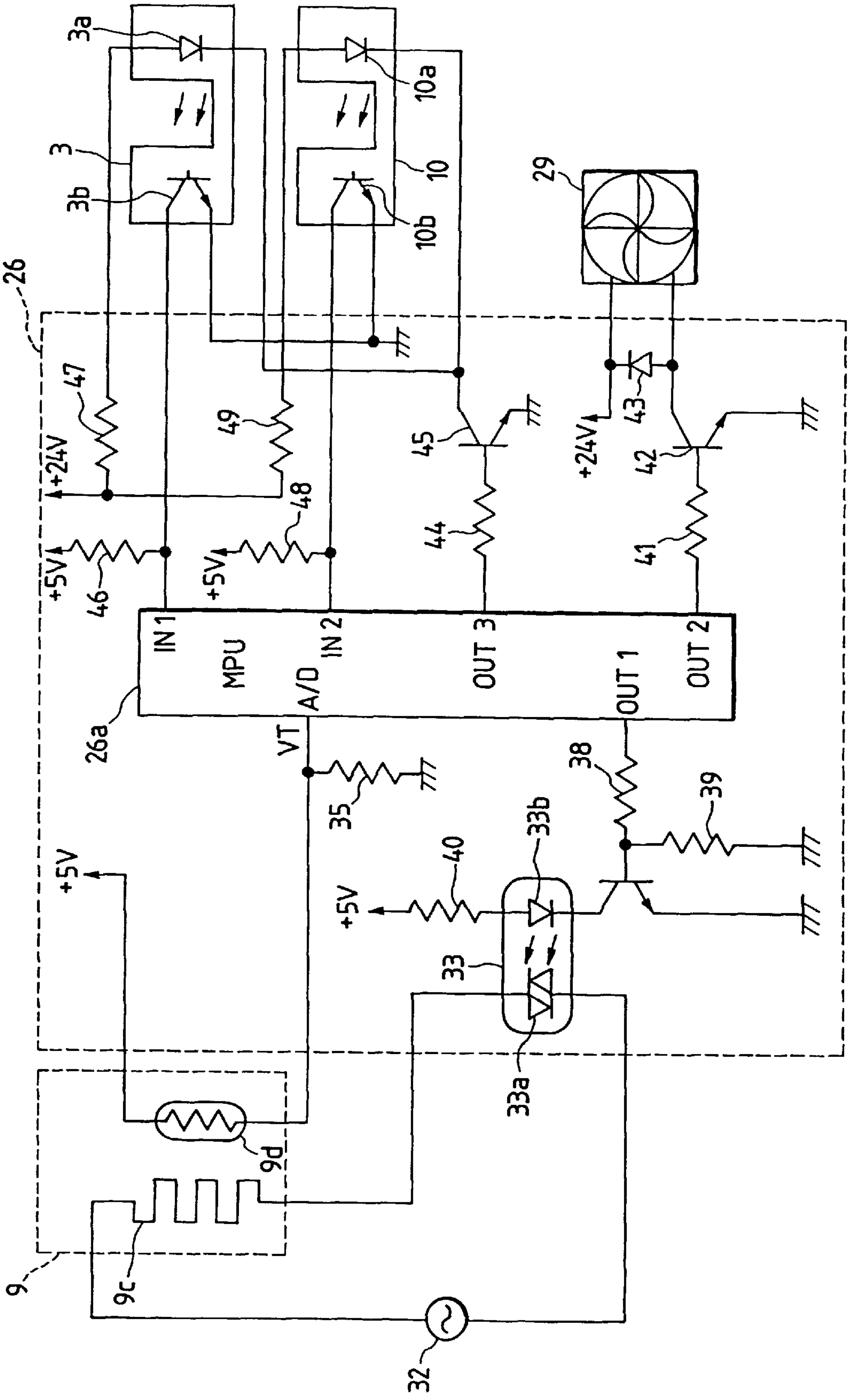
FIG. 12 shows a circuit diagram of a configuration relating to fixing unit control, cooling fan control and photo-sensor control in a third embodiment of the present invention, FIG. 13 illustrate. a relation between a sleep level code and a process content in the third embodiment.

FIG. 12 shows a circuit diagram of the halogen heater drive circuit, the cooling fan drive circuit and the photo-sensor control circuit.

In FIG. 12, the halogen heater drive circuit and the cooling fan drive circuit are identical to those of FIG. 10 shown for the first embodiment and the explanation thereof is omitted.

The photo-sensor control circuit is now explained.

The laser printer of the present embodiment uses two photo-sensors, one being a cassette sheet sensor 3 and the other being a sheet ejection sensor 10. The cassette sheet sensor 3 comprises an LED 3*a* and a photo-transistor 3*b* and detects the status by checking if a light from the LED 3*a* impinges to the photo-transistor 3*b* or not.

An anode of the LED 3*a* is connected to the DC +24 V power supply through a resistor 47 and a cathode thereof is connected to a collector of a transistor 45. An emitter of the transistor 45 is connected to GND and a base thereof is connected to an output port (OUT3) of the MPU 26*a* through a base:resistor 44.

Accordingly, when the MPU 26*a* renders the output port (OUT3) to H, the LED 3*a* is turned on and the detection by the photo-sensor is enabled, and when it renders the output port (OUT3) to L, the LED 3*a* is turned off and the detection is disabled.

An emitter of the photo-transistor 3*b* is connected to GND and a collector thereof is connected to an input port (IN1) of the MPU 26*a* and a pull-up resistor 46. When the light from the LED 3*a* is impinged to a base of the photo-transistor 3*b*, the input port (IN1) is rendered to L, and if it is not impinged, the input port (IN1) is rendered to H.

The same connection is made for the sheet ejection sensor 10, and the LED 3*a* in the above description corresponds to an LED 10*a*, the photo-transistor 3*b* corresponds to a photo-transistor 10*b*, the resistor 47 corresponds to a resistor 49, the pull-up resistor 46 corresponds to a pull-up resistor 48, and the input port (IN1) corresponds to an input port (IN2).

Figures 13, 14:
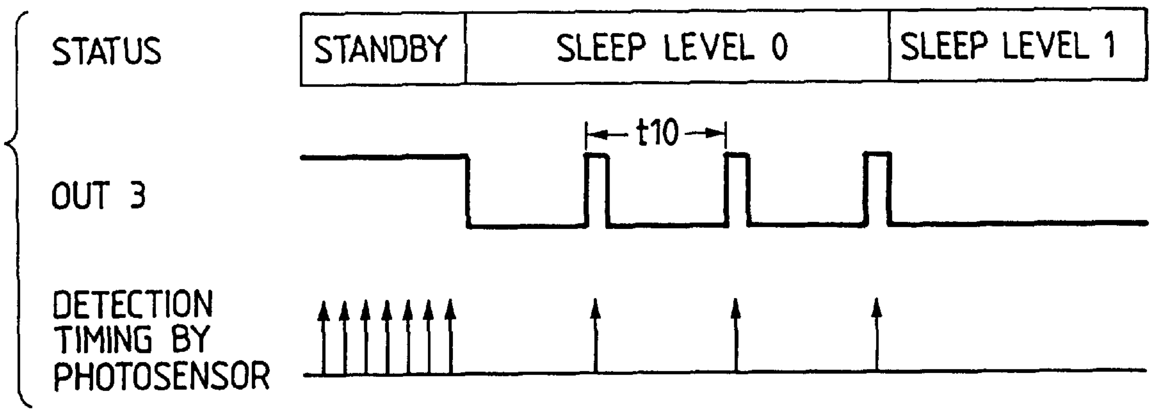
FIG. 14 shows a timing chart of a detection timing of a photo-sensor in the: third embodiment.

FIG. 13 illustrates a relation between the sleep level code and a process content in the third embodiment.

In addition to the first embodiment, a photo-sensor intermittent detection process for the sleep level 0 mode and a photo-sensor detection stop process for the sleep level 1 mode are added.

FIG. 14 shows a timing chart of the photo-sensor detection process in the respective modes.

In the stand-by mode, the MPU 26*a* renders to output port (OUT3) to H to turn on the LED 3*a* and the LED 10*a* so that the detection by the photo-sensor is continuously effected. In the sleep level 0 mode, the LED is turned on at an interval of a period t10 (for example, 10 seconds) and the intermittent detection is made only during that period. In the sleep level 1 mode, the LEDs are turned off and the detection is stopped.

Through this control, the power consumption by the light emission of the LED in the photo-sensor is reduced or eliminated during the sleep mode so that further energy saving is attained.

A Fourth Embodiment

A fourth embodiment of the present invention is now explained. A difference between the fourth embodiment and the third embodiment resides in that the setting of the sleep level is controlled by controlling the energization to the load in accordance with the sleep mode designation command bit.

Figures 15, 16:
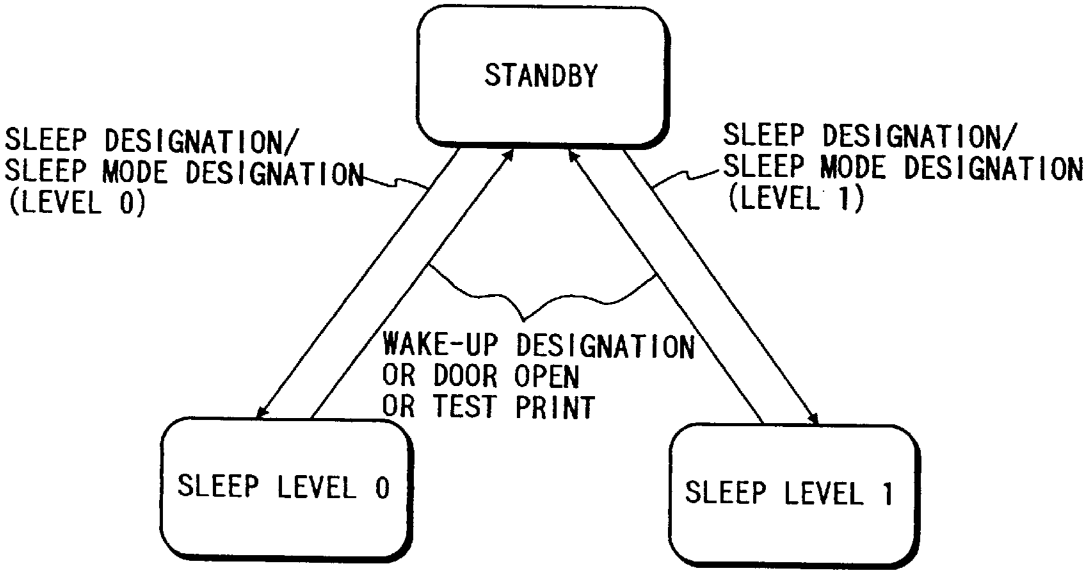
FIG. 15 shows a bit configuration of a sleep mode designation command in a fourth embodiment.
FIG. 16 shows a state transition chart relating to sleep control in a fifth embodiment.

FIG. 15 shows a bit configuration of the second byte of the sleep mode designation command in the fourth embodiment and a process for the bit.

As shown, when the fifth bit is 1, the detection by the photosensor is stopped, when the sixth bit is 1, the cooling fan is deenergized, and when the seventh bit is 1, the fixing unit is deenergized.

By this process, the video controller 27 may designate any combination of sleep modes.

Fifth Embodiment

A fifth embodiment of the present invention is now explained. A difference between the fifth embodiment and the first embodiment resides in the addition of the detection of the direct access to the printer by a user as a condition to transit;from the sleep mode to the stand-by mode.

FIG. 16 shows a state transition chart indicating the state transition relating to the sleep control in the fifth embodiment.

In the sleep level 0 mode and the sleep level 1 mode, the mode is shifted to the stand-by mode when the wake-up designation command is received as well as when the open state of a door (not shown) of the printer which is opened when jam is to be processed or when the user depresses a test print switch (not shown) to print. In the test print, the mode is then shifted to the print mode from the stand-by mode for effecting the test print.

Figure 17:
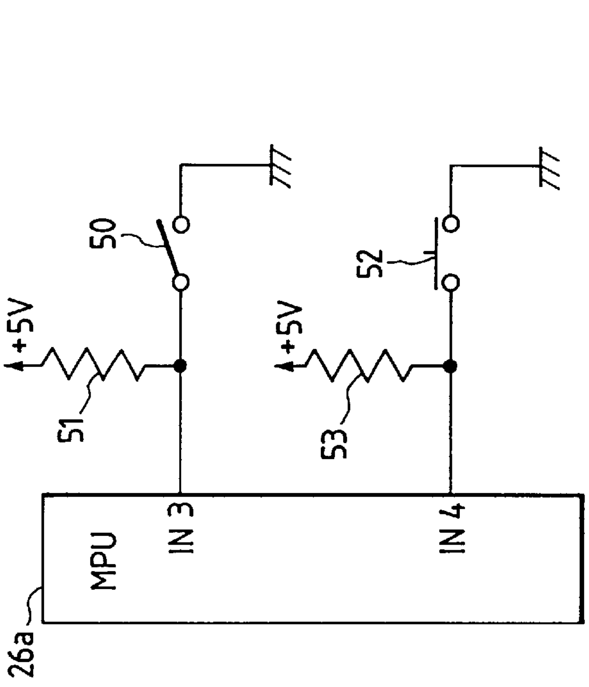
FIG. 17 shows a circuit diagram of a principal part of the fifth embodiment.

FIG. 17 shows a circuit diagram of a principal portion of the fifth embodiment.

A door switch 50 is opened when the door is opened and closed when the door is closed. One terminal of the door switch 50 is connected to GND and the other terminal is connected to a pull-up resistor 51 and the input port (IN3) of the MPU 26*a*. Accordingly, the MPU 26*a* determines that the door is closed when the input port (IN3) is L, and the door is open when the input port (IN3) is H.

A test print switch 52 is normally open and closed when the user depresses the test print switch 52. One terminal of the test print switch 52 is connected to GND and the other terminal is connected to a pull-up resistor 53 and an input port (IN4) of the MPU 26*a*. Accordingly, the MPU 26*a* determines that the test print is requested when the input port (IN4) is L, and the test print is not requested when the input port (IN4) is H.

Sixth Embodiment

A sixth embodiment of the present invention is now explained. A difference between the sixth embodiment and the first embodiment resides in the control which does not accept soft reset by the signal CPRDY in the sleep mode.

Figure 18:
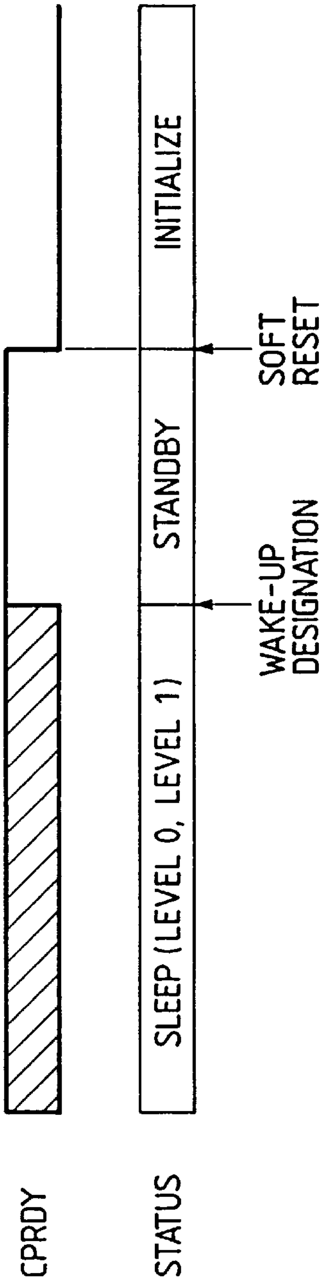
FIG. 18 shows a timing chart illustrating a relation between CPRDY and a printer state in a sixth embodiment of the present invention.

FIG. 18 illustrates a relation between the signal CPRDY and the printer state in the sixth embodiment.

In the sleep level 0 mode and the sleep level 1 mode, the sleep mode is maintained whether the state of CPRDY is true (H) or false (L). The video controller 27 renders CPRDY true (H) and sends the wake-up designation command, and after the printer state has been shifted to the stand-by mode, it renders CPRDY false (L) so that the engine controller 26 is reset and the printer is initialized.

Accordingly, even if CPRDY is rendered false by the energy saving control (partial deenergization in the video controller) of,the video controller 27 when the printer is in the sleep mode, the engine controller 26 is not reset and the sleep mode is maintained.

Seventh Embodiment

A seventh embodiment of the present invention is now explained. A difference between the seventh embodiment and the first embodiment resides in that a time from the transmission of the sleep designation command to the transition to the sleep mode and a time from the transition to the sleep mode to the automatic wake-up are settable.

Figures 19, 20:
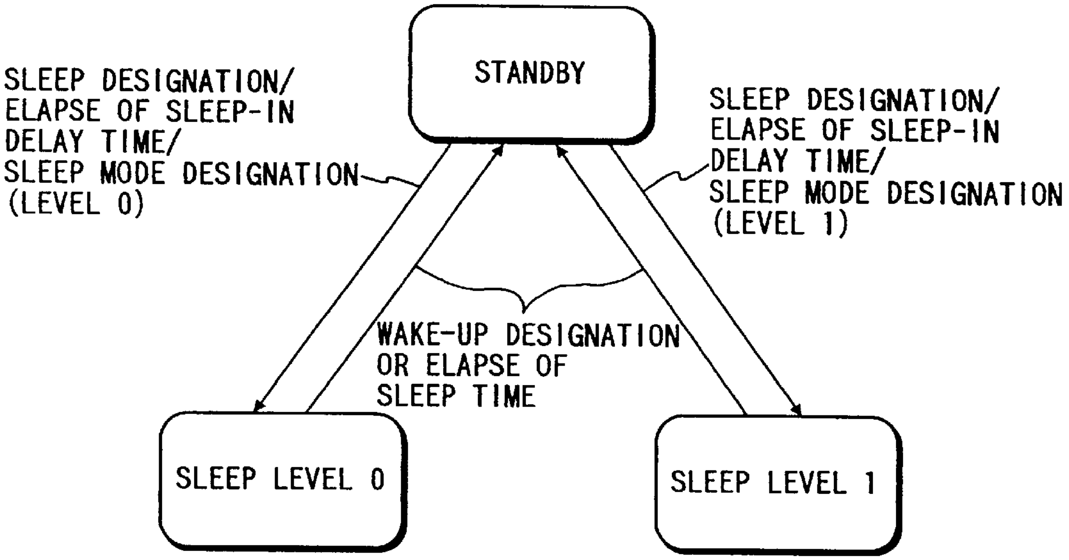
FIG. 19 shows a state transition chart for sleep control in a seventh embodiment.
FIG. 20 shows a list of command codes relating to the sleep control in the seventh embodiment.

FIG. 19 shows a state transition chart indicating the state transition relating to the sleep control in the seventh embodiment.

As shown, when the sleep designation command is received in the stand-by mode, the mode is shifted to the sleep mode designated by a sleep mode designation command after a delay time: designated by a sleep-in delay time command to be described later.

On the other hand, the mode is shifted from the sleep mode to the stand-by mode after the elapse of the sleep time (the time elapsed after the transition to the sleep mode) designated by a wake-up designation command of a sleep time designation command to be described later.

The sleep-in delay time designation and the sleep time designation are now described.

FIG. 20 illustrates the commands relating to the sleep control in the seventh embodiment.

The sleep-in delay time designation is effected by the sleep-in delay time designation command which is the second byte command as is the sleep mode designation command. The first byte of the sleep-in delay designation command is 83H and the second byte is configured as shown in FIG. 21. The binary value of the six bits, second to seventh bits of the second byte indicates a time with one bit corresponding to ten minutes.

Namely, if it is 000111 (B), it represents 6×10 minutes so that the delay time of 60 minutes is designated.

On the other hand, the sleep-in time is designated by the sleep time designation command which is the second byte command. The first-byte of the sleep time designation command is 85H and the second byte is configured as shown in FIG. 22. The binary value of six bits, the second to seventh bits of the second byte indicates a time with one bit corresponding to ten minutes.

For example, if it is 001000 (B), it indicates 8×10 minutes so that the sleep time of 80 minutes is designated.

By this arrangement, the video controller 27 may reduce the time management process for the sleep control.

Eighth Embodiment

An eighth embodiment of the present invention is now explained. A difference between the eighth embodiment and the seventh embodiment resides in the consolidation of the sleep-in delay time designation command and the sleep time designation command.

FIG. 23 illustrates commands relating to the sleep control in the eighth embodiment.

The sleep-in delay time designation and the sleep time designation are effected by a sleep-in delay time designation/sleep time designation command which is a 2-byte command. The first byte of the command is 83H and the second byte is configured as shown in FIG. 24. The binary value of three bits, second to fourth bits of the second byte indicates the sleep-in delay time and the binary value of three bits, fifth to seventh bits indicates the sleep time, with one bit corresponding to 30 minutes.

For example, if it is 010100 (B), it indicates 4×30 minutes so that the delay time of 2 hours is designated, and 8×30 minutes so that the sleep time of 4 hours is designated.

Thus, both the sleep-in delay time and the sleep time can be designated by the single command so that the command configuration and the exchange thereof are simplified.

Ninth Embodiment

A ninth embodiment of the present invention is now explained. In the present embodiment, the construction of the laser beam printer is common to that shown in FIG. 1 and the explanation thereof is omitted. A basic operation is also common to that described in connection with FIGS. 3 to 5 and the explanation thereof is omitted.

Figure 25:
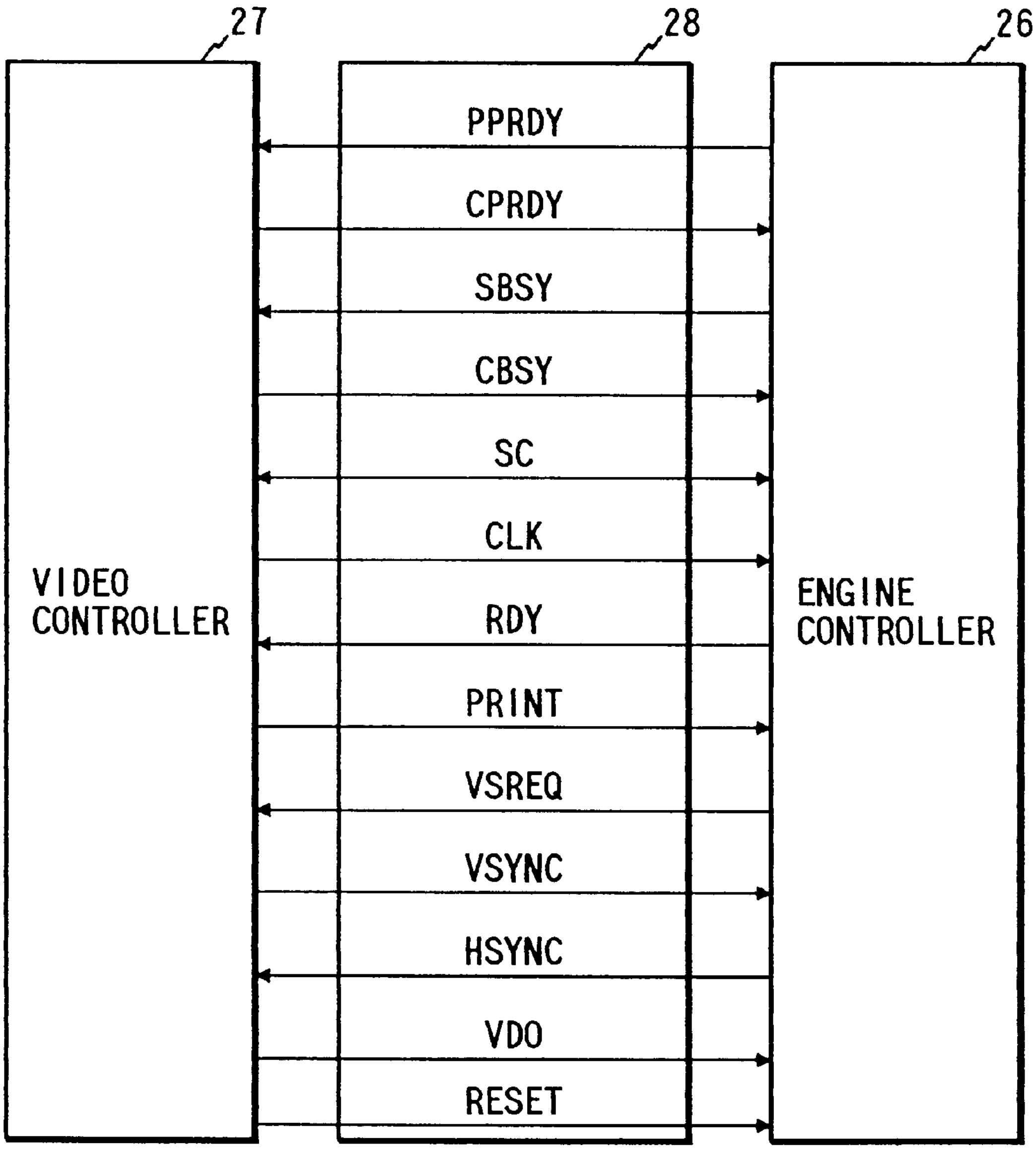
FIG. 25 shows a block diagram of a video interface in a ninth embodiment of the present invention.

FIG. 25 shows a block diagram of a configuration of the video interface 28 shown in FIG. 1.

In FIG. 25, RESET is a reset signal by which the video controller 27 hard-resets the engine controller 26. Others are common to those shown in FIG. 2 and the explanation thereof is omitted.

The energy saving or the sleep control in the present embodiment is now explained.

The printer 1 is either in the stand-by mode or in the sleep mode except in the print mode provide that no abnormal state such as failure occurs.

In the stand-by mode, the mode may be immediately shifted to the print mode upon print request. Specifically, the temperature of the fixing unit 9 is set to a lower temperature than that in the print mode (for example, the fixing unit temperature in the stand-by mode is 150° C. while the fixing unit temperature in the print mode is 190° C.) and the cooling fan 29 is energized to cool the video controller.

On the other hand, in the sleep mode, the power consumption is further reduced than that in the stand-by mode. The sleep mode includes three levels, sleep level 0, sleep level 1 and sleep level 2. In the level 0, the fixing unit is deenergized, in the level 1, the fixing unit 9 is deenergized as well as the cooling fan 29 is deenergized, and in the level 2, in addition to the level 1, the clock of the MPU 26*a* in the engine controller is stopped. The transition from the stand-by mode to the sleep mode is effected in accordance with a command sent from the video controller 27 to the engine controller 26 through the video interface 28.

Figures 26, 27:
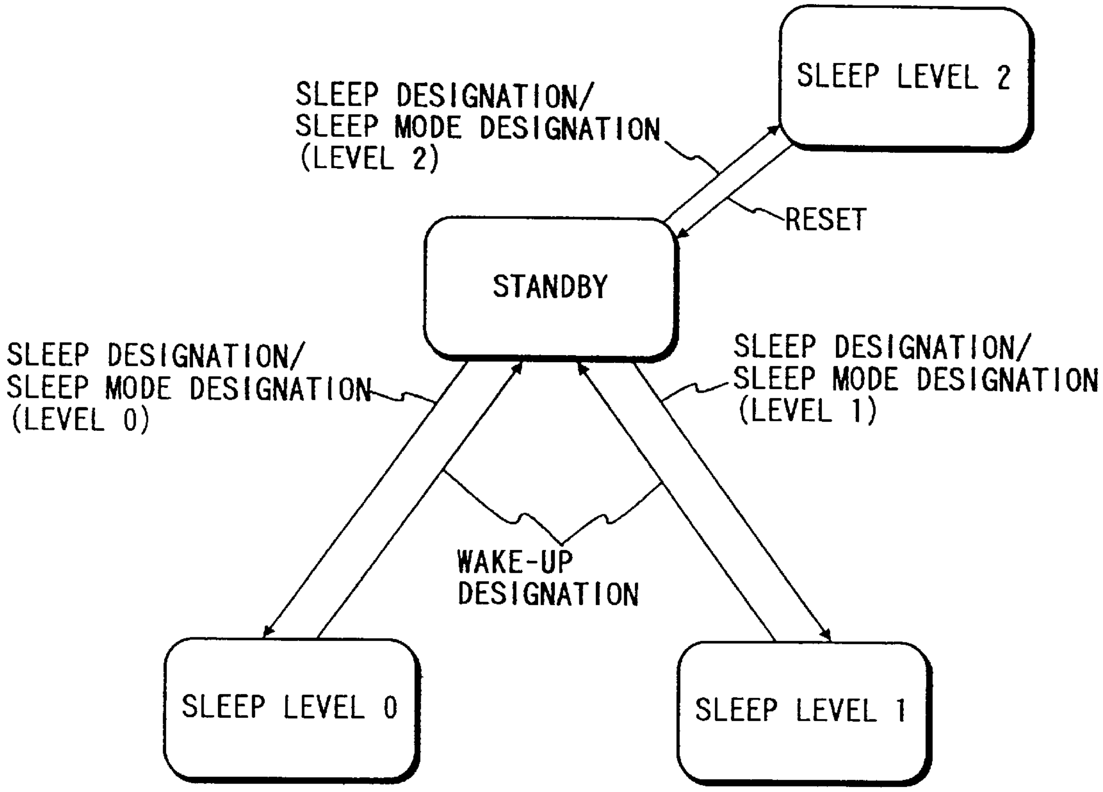
FIG. 26 shows a state transition chart relating to the sleep control in the ninth embodiment.
FIG. 27 illustrates a relation between a sleep level code and a process content in the ninth embodiment.

FIG. 26 shows a state transition chart illustrating the state transition relating to the sleep control of the main unit 1.

As shown, the mode is shifted from the stand-by mode to the sleep level 0 mode by the sleep designation command and the designation of the sleep level 0 by the sleep mode designation command.

The mode is shifted from the stand-by mode to the sleep level 1 mode by the sleep designation command and the designation of the sleep level 1 by the sleep mode designation command.

Further, the mode is shifted from the stand-by mode to the sleep level 2 mode by the sleep designation mode and the designation of the sleep level 2 by the sleep mode designation command.

The mode is shifted. from the level 0 or level 1 sleep mode to the stand-by mode by the wake-up designation command.

When hard-reset is applied in the level 2 sleep mode, the mode is shifted to the stand-by mode through the initial reset.

In the commands relating to the sleep control, 45H of the hexadecimal code is allocated to the sleep designation and 46H is allocated to the wake-up designation, as shown in FIG. 7.

The sleep mode designation is of 2-byte command configuration. The video controller 27 sends the command code 80H at the first byte and sends a predetermined command at the second byte to designate the sleep level.

The second byte of the sleep mode designation command is configured as shown in FIG. 8.

The command designates the sleep level by the 3-bit (fifth to seventh bits) of the 8 bits.

FIG. 27 illustrates a relation between the sleep level code and a process content in the present embodiment. The code 000 designates the sleep level 0, that is, the deenergization of the fixing unit. The code 001 designates the sleep level 1, that is, the deenergization of the fixing unit and the deenergization of the cooling fan. The code 010 designates the sleep level 2, that is, the stop of the clock of the MPU 26*a*. The codes 011–111 are unused.

Figure 28:
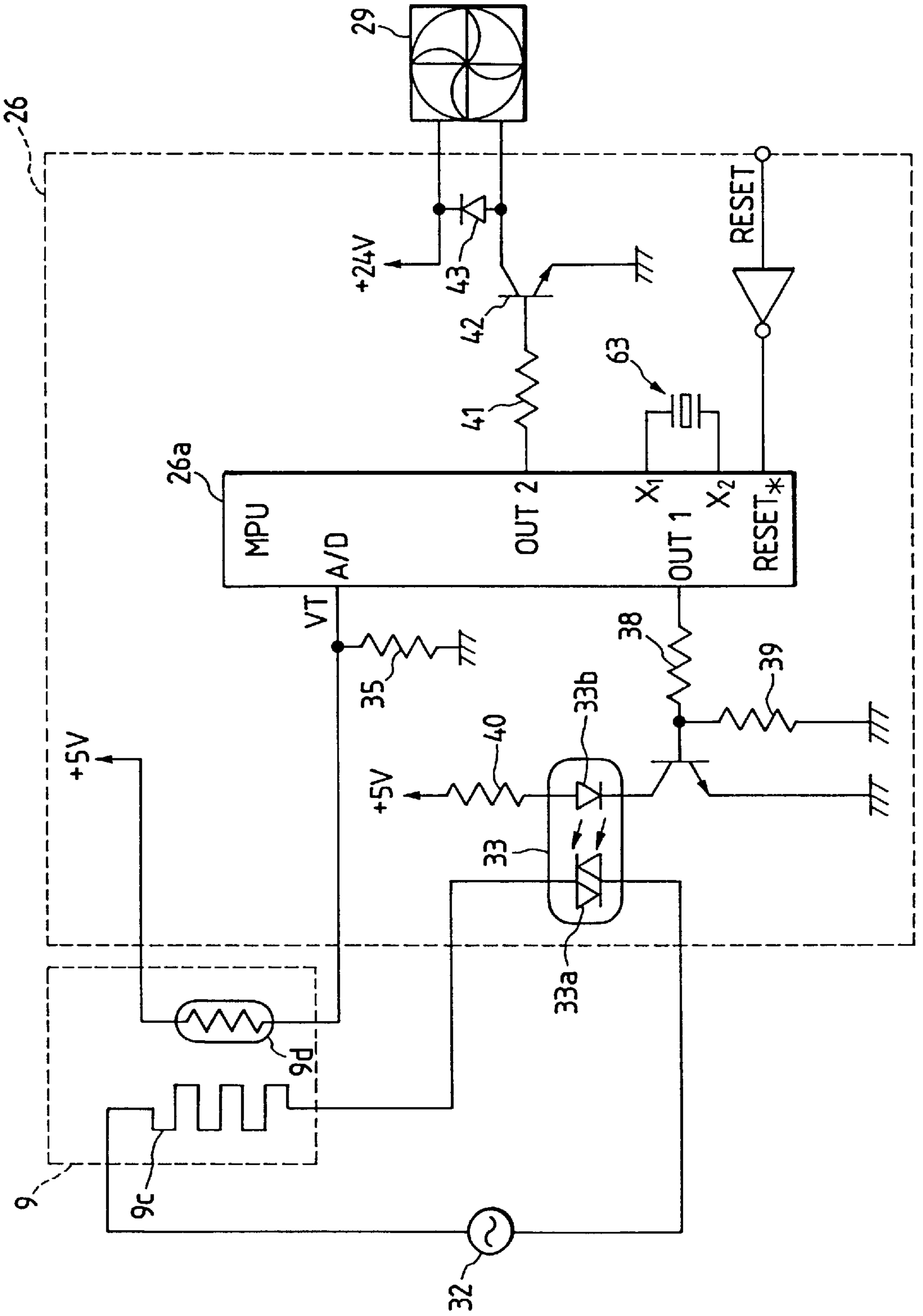
FIG. 28 shows a circuit diagram of a configuration relating to fixing unit control and cooling fan control in the ninth embodiment.

FIG. 28 shows a circuit diagram of the halogen heater drive circuit for controlling the temperature of the fixing unit 9 shown in FIG. 1 and the drive circuit for the cooling fan 29.

Basically, it is identical to that shown in FIG. 1 for the first embodiment but in the present embodiment, the MPU 26*a* uses the NEC μPD78214 and has a crystal oscillator 68 shown and RESET * terminal (where * indicates a negative logic).

The sleep mode 2 is now explained in detail.

The sleep modes 0 and 1 are designated by the MPU 26*a* and the MPU 26*a* continues its operation even during the sleep mode while the MPU 26*a* per se does not operate in the sleep mode 2. In the sleep mode 2, the MPU 26*a* stops the oscillation and stops the overall operation.

The MPU 26*a* may be operated with a very small power consumption with a leakage current only. This is referred to as a stop mode of the MPU.

Figure 29:
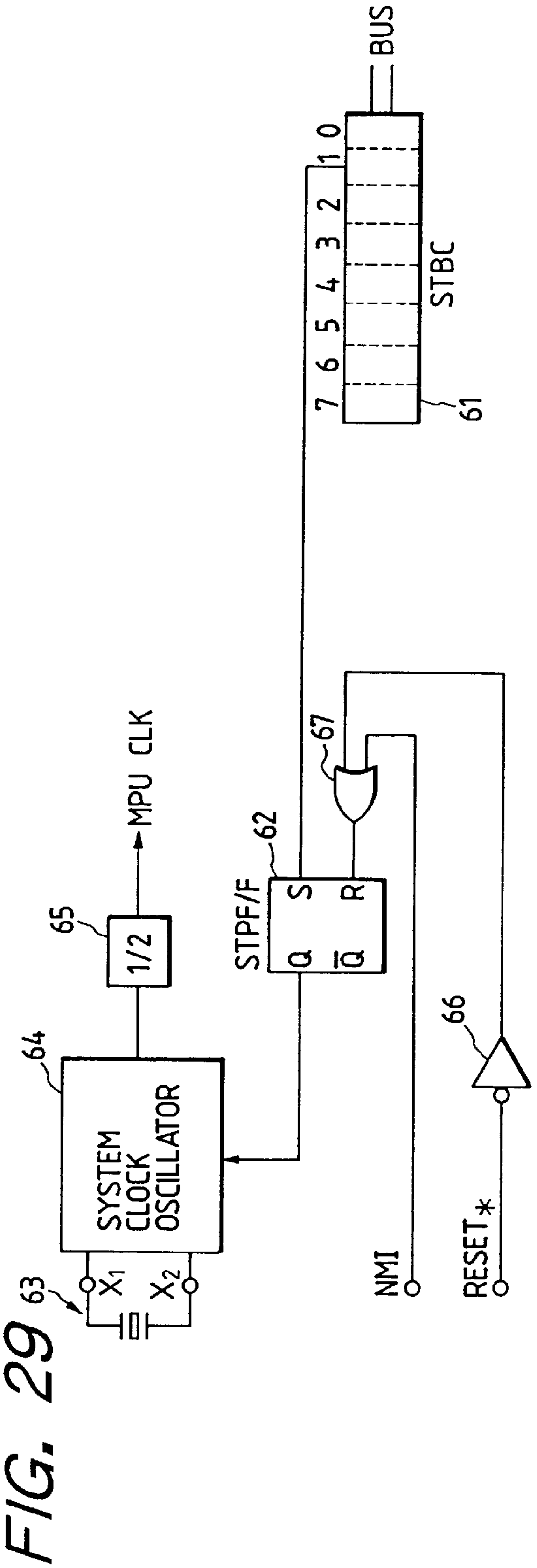
FIG. 29 shows a block diagram of a configuration of a control circuit of a clock oscillation circuit of an MPU of the ninth embodiment.

FIG. 29 shows a block diagram of a configuration of a control circuit of a clock oscillation circuit of the MPU 26*a*. Referring to FIG. 29, an internal operation of the MPU 26*a* is explained.

When the MPU 26*a* receives the sleep mode 2 request, it carries out the sleep mode process, that is, deenergizes the fixing unit 9 and deenergizes the fan 29 and renders PPRDY of the interface signal 28 false and then sets the bit 1 of a stand-by control register STBC 61 through an internal bus. Thus, a stop flip-flop 62 is set and stops the operation of a system clock oscillator 64 which generates a clock by using the crystal oscillator 63.

When the oscillator 64 is stopped, a frequency divider 65 which divides the output of the oscillator 64 is also stopped and the clock supplied to the MPU 26*a* is stopped so that the entire MPU 26*a* is stopped. Thus, the stop mode is entered.

In order to wake up from the stop mode, the system should be hard-started up. The start-up may be effected by a non-maskable interrupt terminal NMI or a reset signal. In the ninth embodiment, a method by the reset signal is explained.

When a signal RESET of the interface signal 28 of FIG. 25 is applied to the terminal RESET * of the MPU 26*a*, the stop flip-flop 62 is reset through an inverter 66 and an OR circuit 67 of FIG. 29 and the system clock oscillator 64 is started and the MPU 26*a* is started.

The MPU 26*a* is reset,simultaneously with the start so that it is initialized such as memory clear and port initialization. To start up from the sleep mode, whether a command 46H, the wake-up designation is to be used or the reset signal is to be used is stored by the video controller 27.

If PPRDY signal is false, the reset signal from the video controller 27 may be outputted.

Tenth Embodiment

A tenth embodiment of the present invention is now explained.

In the tenth embodiment, another start-up method from that of the ninth embodiment is explained. In the ninth embodiment, the signal RESET is applied to the terminal RESET * of the MPU 26*a*. Thus, the initialization operation is started simultaneously with the start-up from the sleep mode and the memory is cleared.

Thus, when the signal PPRDY of the interface signal 28 is rendered true after the start-up, it is necessary for the video controller 27 to conduct the entire communication protocol from the beginning.

Figure 30:
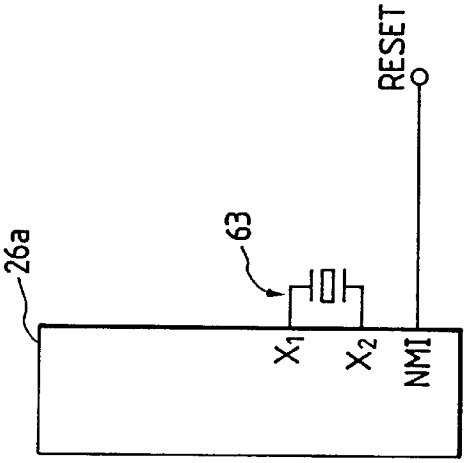
FIG. 30 shows a block diagram of a configuration of a control circuit of a clock oscillation circuit of an MPU of a tenth embodiment of the present invention.

In the tenth embodiment, as shown in FIG. 30, the signal RESET for the start-up is applied to the non-maskable interrupt terminal NMI of the MPU 26*a*.

In this case, the MPU 26*a* is started up without being reset. After the start-up, the engine controller 26 is immediately set to the stand-by mode and the signal PPRDY of the interface signal 28 is rendered true. Thus, the video controller 27 need not conduct the initial protocol to start the communication with the printer and the data in the memory of the MPU 26*a* is maintained. Accordingly, the retransmission of the data prior to the sleep is not necessary.

The signal RESET is not the reset function and it may be correctly referred to as a signal WAKE-UP.

Eleventh Embodiment

An eleventh embodiment of the present invention is now explained.

Figure 31:
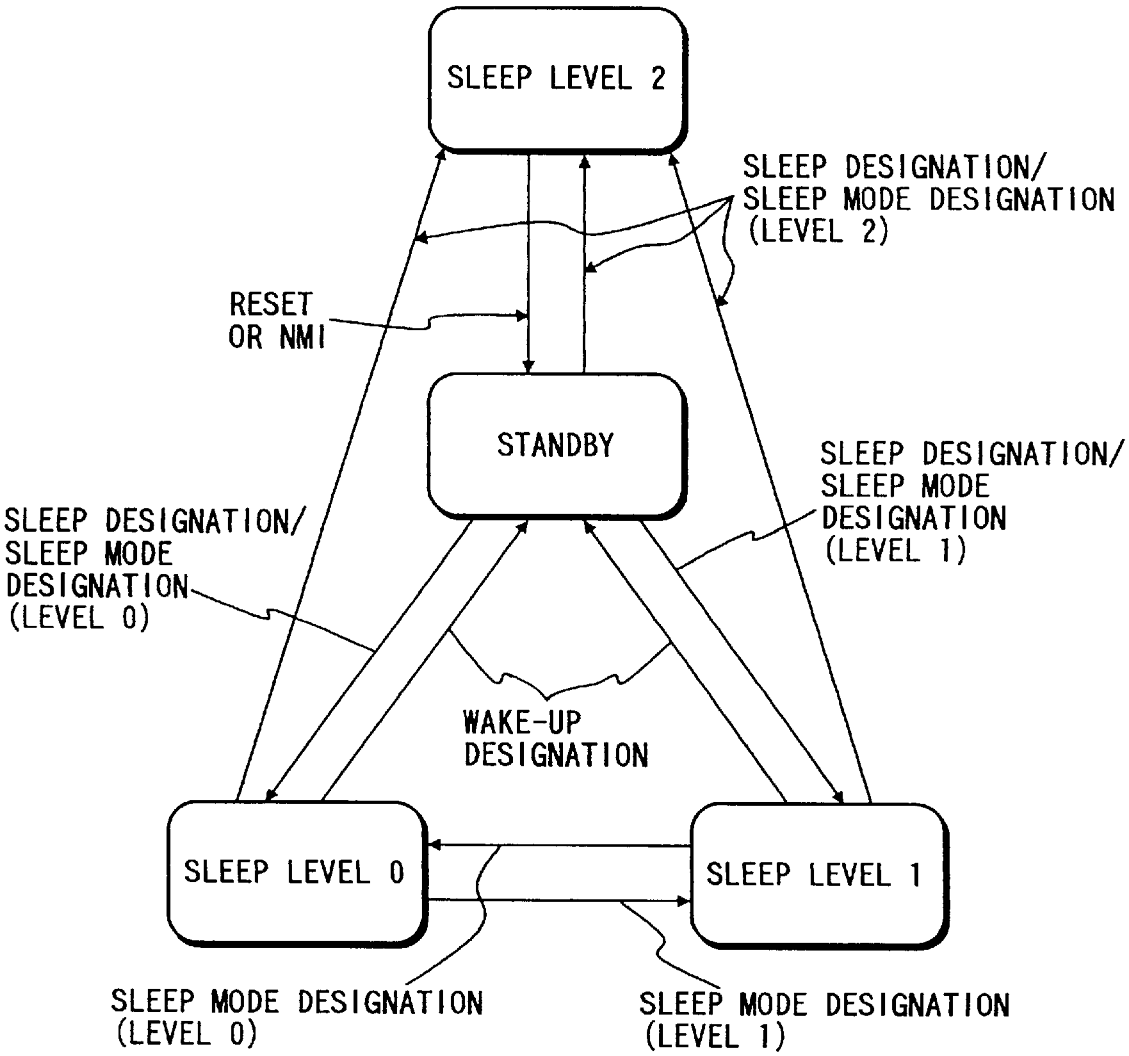
FIG. 31 shows a state transition chart relating to sleep control in an eleventh embodiment of the present invention.

FIG. 31 illustrates a state transition relating to the sleep control capable of changing the level during the sleep.

When the printer is in the sleep level 0 or 1 and the video controller 27 sends the sleep mode designation command to the engine controller 26, and if the sleep level 2 is designated, the printer is shifted to the sleep level 2 mode.

When a printer is in the sleep level 0 and the sleep level 1 is designated, the printer is shifted to the sleep level 1, and when the printer is in the sleep level 1 and the sleep level 0 is designated, the printer is shifted to the sleep level 0.

However, when the printer is in the sleep level 2, it is not possible to change the sleep level by the command because the MPU 26*a* is not operating and the signal RESET is applied to the terminal RESET * or the terminal NMI to reset it to the stand-by mode.

Since the wake-up designation command and the sleep designation command may be omitted in changing the sleep level, the process load is reduced.

In accordance with the present invention, the function to designate the mode from the video control means for a plurality of sleep modes in the recording means is provided in the communication means so that optimum energy saving control to various operation conditions of the printer such as the frequency of use and the reduction of the financial burden of the power consumption is attained.

The present invention should not be limited to the above illustrated embodiments but many modifications thereof may be made. The above embodiments may be combined in any manner and they are within the scope of the present invention.

What is claimed is:

1. An image forming apparatus comprising:

image forming means for forming an image on a sheet;

a sheet sensor for detecting a sheet; and control means for selectively executing a first mode in which a presence/absence of a sheet can be quickly detected and a second mode in which a presence/absence of a sheet cannot be quickly detected, wherein said control means comprises discriminating means for performing a discrimination of whether or not a sheet is at said sheet sensor in accordance with a signal from said sheet sensor, and wherein in the first mode, said sheet sensor is driven continuously and said discriminating means performs the discrimination periodically with a short interval, and in the second mode, said sheet sensor is driven intermittently and said discriminating means performs the discrimination during a time said sheet sensor is being driven and does not perform the discrimination during a time said sheet sensor is not being driven.

2. An apparatus according to claim 1, wherein said sheet sensor includes a light emitting element and a light receiving element.

3. An apparatus according to claim 2, wherein said control means comprises a CPU that has an output port for outputting a control signal for driving the light emitting element and an output port for inputting a signal output from the light receiving element.

4. An apparatus according to claim 3, wherein a detection at the input port is enabled during a time the control signal for driving the light emitting element is being output, and is disabled during a time the control signal is not being output.

5. An apparatus according to claim 1, wherein said apparatus is operable in a third mode in which said sheet sensor is inhibited from being driven.

6. An apparatus according to claim 5, wherein said image forming means forms the image on the basis of an image signal from an image signal generating apparatus and wherein the second mode or the third mode is set on the basis of a command from the image signal generating apparatus.

7. An apparatus according to claim 5, wherein the image signal generating apparatus outputs a designation command for designating one of the second and third modes as an economy mode to be selected and an instruction command for instruction execution of the economy mode designated by the designation command.

8. An apparatus according to claim 7, wherein said control means transits to a newly designated economy mode when a designation command to designate an economy mode different from the economy mode which is being executed is output from the image signal generating apparatus.

9. An apparatus according to claim 1, wherein said control means release the economy mode which is being executed when a release command of the economy mode is output from the image signal generating apparatus.

10. An apparatus according to claim 1, wherein said sheet sensor is provided for at least one of a detection of a sheet set in sheet feeding means and a detection of a sheet to be discharged.

11. An image forming method comprising the steps of:

an image forming step for forming an image on a sheet;

a sheet sensor for detecting a sheet; and a control step for selectively executing a first mode in which a presence/absence of a sheet can be quickly detected and a second mode in which a presence/absence of a sheet cannot be quickly detected, wherein said control step comprises a discriminating step for performing a discrimination of whether or not a sheet is at said sheet sensor in accordance with a signal from said sheet sensor, and wherein in the first mode, said sheet sensor is driven continuously and said discriminating step performs the discrimination periodically with a short interval, and in the second mode, said sheet sensor is driven intermittently and said discriminating step performs the discrimination during a time said sheet sensor is being driven and does not perform the discrimination during a time said sheet sensor is not being driven.

12. A method according to claim 11, wherein said sheet sensor includes a light emitting element and a light receiving element.

13. A method according to claim 12, wherein said control step comprises a CPU that has an output port for outputting a control signal for driving the light emitting element and an output port for inputting a signal output from the light receiving element.

14. A method according to claim 13, wherein a detection at the input port is enabled during a time the control signal for driving the light emitting element is being output, and is disabled during a time the control signal is not being output.

15. A method according to claim 11, wherein said apparatus is operable in a third mode in which said sheet sensor is inhibited from being driven.

16. A method according to claim 15, wherein said image forming step forms the image on the basis of an image signal from an image signal generating apparatus and wherein the second mode or the third mode is set on the basis of a command from the image signal generating apparatus.

17. A method according to claim 15, wherein the image signal generating apparatus outputs a designation command for designating one of the second and third modes as an economy mode to be selected and an instruction command for instruction execution of the economy mode designated by the designation command.

18. A method according to claim 17, wherein said control step transits to a newly designated economy mode when a designation command to designate an economy mode different from the economy mode which is being executed is output from the image signal generating apparatus.

19. A method according to claim 11, wherein said control step release the economy mode which is being executed when a release command of the economy mode is output from the image signal generating apparatus.

20. A method according to claim 1, wherein said sheet sensor is provided for at least one of a detection of a sheet set in sheet feeding step and a detection of a sheet to be discharged.

* * * * *

UNITED STATES PATENT AND TRADEMARK OFFICE

CERTIFICATE OF CORRECTION

PATENT NO. : 6,407,826 B2
DATED : June 18, 2002
INVENTOR(S) : Hiroshi Hashimoto et al.

It is certified that error appears in the above-identified patent and that said Letters Patent is hereby corrected as shown below:

Column 2,
Line 39, "illustrate." should read -- illustrates --; and
Line 43, "the:" should read -- the --.

Column 4,
Line 16, "is." should read -- is --.

Column 6,
Line 7, "image." should read -- image --.

Column 7,
Line 1, "designate" should read -- designates --; and
Line 55, "sleep." should read -- sleep --.

Column 8,
Line 30, "base:resistor" should read -- base resistor --.

Column 9,
Line 27, "transit;from" should read -- transit from --.

Column 10,
Line 8, "of,the" should read -- of the --; and
Line 25, "time:" should read -- time --.

Column 12,
Line 1, "shifted." should read -- shifted --.

Column 13,
Line 4, "reset,simultaneously" should read -- reset simultaneously --.

Column 14,
Line 61, "release" should read -- releases --.

UNITED STATES PATENT AND TRADEMARK OFFICE

CERTIFICATE OF CORRECTION

PATENT NO. : 6,407,826 B2
DATED : June 18, 2002
INVENTOR(S) : Hiroshi Hashimoto et al.

It is certified that error appears in the above-identified patent and that said Letters Patent is hereby corrected as shown below:

Column 16,
Line 23, “release” should read -- releases --; and
Line 28, “in” should read -- in a --.

Signed and Sealed this

Fifteenth Day of April, 2003

JAMES E. ROGAN
*Director of the United States Patent and Trademark Office*